Nov. 1, 1955    G. W. MORGAN ET AL    2,722,609
RADIATION ANALYSIS
Filed July 11, 1952
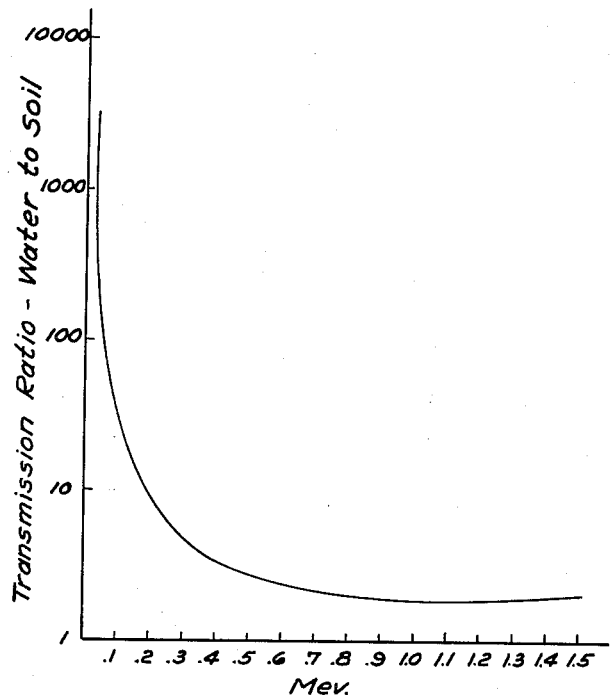
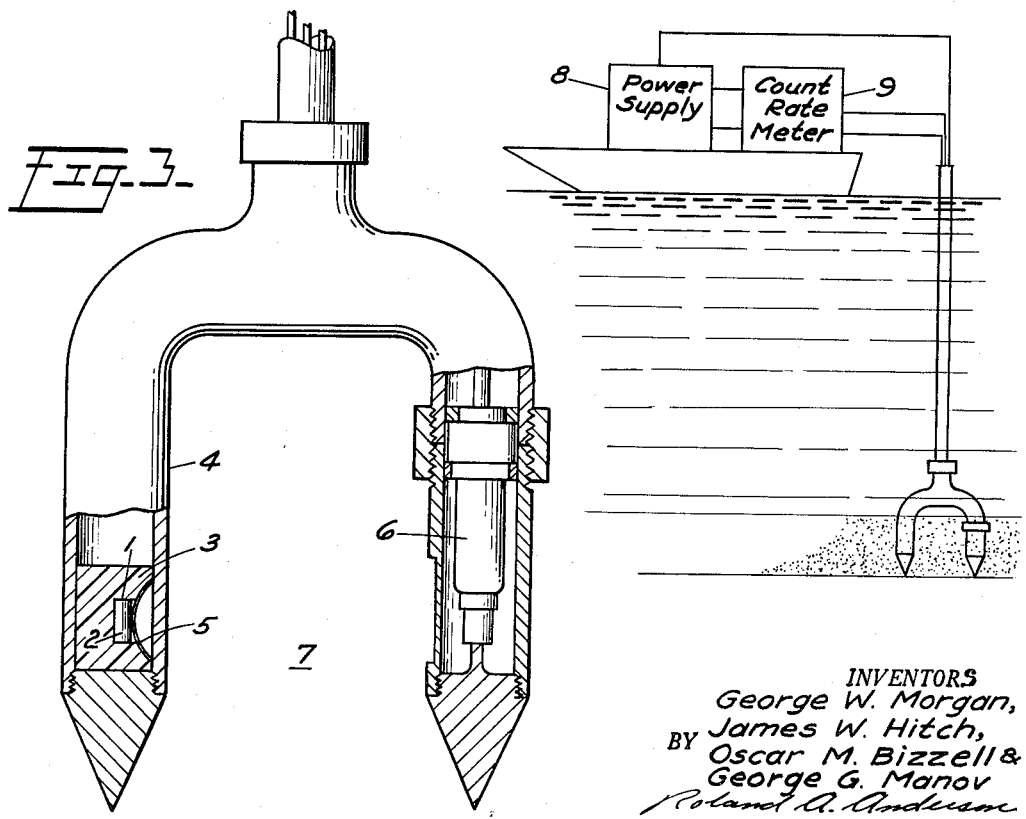
INVENTORS
George W. Morgan,
James W. Hitch,
Oscar M. Bizzell &
George G. Manov
BY
ATTORNEY

United States Patent Office 2,722,609
Patented Nov. 1, 1955

2,722,609

RADIATION ANALYSIS

George W. Morgan, Oscar M. Bizzell, and George G. Manov, Oak Ridge, and James W. Hitch, Maryville, Tenn., assignors to the United States of America as represented by the United States Atomic Energy Commission Application July 11, 1952, Serial No. 298,412

7 Claims. (Cl. 250—43.5)

Our invention relates to a method and apparatus for radiation analysis, and more especially to determination of the density of silt or mud which has accumulated at the bottom of bodies of water.

The use of gamma ray transmission type gauges known to the prior art is not practical in the measurement herein desired, for several reasons, as will be fully set out below. Accordingly, it is a primary object of our invention to provide a novel method and apparatus for analyzing the mud at the bottom of bodies of water to determine the density thereof.

Other objects and advantages of our invention will become apparent from the following detailed description of our invention and of the operation of a preferred embodiment thereof.

In attempting to measure the density of silt at the bottom of large bodies of water such as lakes, rivers, settling basins, and the like, measurements with gamma ray transmission gauges of the type known to the prior art were found totally unsatisfactory. For example, utilizing a source of cobalt 60, the ratio of radiation transmission between one foot of pure water and one foot of wet soil was approximately one to two. It was therefore impractical to determine intermediate transmission values for the various mixtures of water and soil such as would occur in the silt at the bottom of lakes, in order to calibrate a detector in terms of density.

With the knowledge of the difficulties of the prior art, we have discovered that the low ratio of transmission through water to transmission through wet soil characteristic of available gamma emitters of a suitable half-life does not obtain over the entire energy spectrum of electromagnetic radiations, but is very energy-dependent. We have found that for radiations having energies below about .3 m. e. v., the transmission ratio increases very strikingly with a decrease in the energy of radiation. Where for radiations of above 1.0 m. e. v. energy the transmission ratio is below 3, this ratio rises above 1000 at very low energies.

It is apparent from Fig. 1 that the most useful radiation for making the measurements desired would be one having an extremely low energy, to best utilize the great differential in transmission ratios at such energy. Yet such low-energy radiations do not have sufficient energy to penetrate silt deposits in numbers large enough to actuate detectors and provide a suitable indication. Moreover, no known gamma source meets the above requirements, even for a compromise in the energy required to obtain the desired penetrating qualities. A further complicating factor is the short half-life of presently known gamma emitters. It would be uneconomical and impractical to use a source having a very short half-life in a field instrument, since the source would have to be returned to a nuclear reactor for neutron bombardment at frequent intervals to maintain its strength, and since the counting instruments would have to be recalibrated on a day to day, or perhaps hour to hour, basis to take into account the radioactive decay of such samples.

With the knowledge of the above difficulties of the prior art, we have found that bremsstrahlung radiation may be created by bombarding a foil with beta particles, providing a source of radiation especially suited for the density measurements required. The radiation produced is not characterized by rays of a single energy, but rather extends over a spectrum extending down to substantially zero energy. It is apparent from Fig. 1 that with low energy radiations below .1 m. e. v. available, extremely high transmission ratios will be obtained. Yet there are also enough high energy radiations in the spectrum produced so that a great number pass through the silt deposit to actuate the detector. We have demonstrated that with a bremsstrahlung source of a spectrum of low energy radiations, wide differences in counting rate of the detector may be obtained for different densities of silt, so that accurate calibration of the instrument may be obtained.

Bremsstrahlung radiation is the secondary photon radiation produced by deceleration of charged particles passing through matter. See Glossary of Terms in Nuclear Science and Technology, vol. VI, 1950. It is usually produced by permitting a stream of beta radiations to impinge upon a metal radiator, from which the radiation invariably covers a considerable range of wave lengths in a continuous spectrum. The term "Bremsstrahlung" literally means "braking" or "slowing down radiation," and was derived upon the theory that deceleration of a moving electric charge must be accompanied by the emission of radiation.

Referring now to the drawings,

Fig. 1 represents an original determination of the relative transmission ratios for electromagnetic radiations of water and soil;

Fig. 2 illustrates in schematic representation a preferred embodiment of the invention; and Fig. 3 illustrates in detail one suitable probe arrangement for silt density measurement.

Referring now to Figs. 2 and 3 a preferred embodiment of our invention is schematically illustrated resting on a lake floor. A source of beta rays 1, enclosed in a light metal container 2 and shielded by a lucite block 3 is disposed within iron pipe 4. Foil 5 is mounted in front of the source to stop the beta radiations and produce bremsstrahlung therefrom. Detector 6 is disposed in spaced relation to receive the bremsstrahlung which penetrates the silt and water in the space generally indicated 7. A suitable battery operated voltage supply 8 energizes the detector 6 and counting circuit 9, which is provided with a meter or recorder, to measure the detected radiation.

Calibration curves for the meter or recorder may be obtained by removing a sample of the silt to be measured from the lake bottom and adding water until saturation is reached; that is, until addition of water causes an increase in volume of the sample. Then the source of bremsstrahlung may be disposed on one side of the wet soil, with the detector on the opposite side, and the detector response for a given time interval is obtained. Then a selected amount of water is added to the sample to reduce its density and a second reading of detector response vs. density is obtained. This procedure may be repeated several times to obtain a plurality of points over the entire density range which could be anticipated. From the calibration points obtained, curves of counts per minute vs. kilograms of soil per cubic foot of mud may be drawn. After such calibration, the probe may be lowered into the deposit on the bottom of a body of water and a reading taken over a predetermined time interval. The measured response of the detector disposed under water may be compared to the calibration curve to determine the density, within very accurate limits.

While several known combinations of discs and beta sources are readily ascertainable by those skilled in the art to provide the most efficient spectrum for any particular application, we have found that rays from strontium of atomic number 90 incident upon a lead disc or hemisphere produced an eminently suitable source of radiations. The detecting element is preferably a scintillation counter, because of its relatively high efficiency for low energy electromagnetic radiations. However, Geiger-Mueller counters and ion chambers could alternatively be used, with a reduction in overall sensitivity. The probe housings 4 are provided to protect the source and the sensitive detecting element from water pressure and from protuberances on the lake bottom during probing, and also provide convenient means for lowering the instrument onto the lake floor. Strontium-90 and lead is preferred as a source of bremsstrahlung because it is readily available, the radiation has the desired energy characteristics over an energy spectrum extending down to substantially zero, and because the strontium has a suitable half-life for a portable sealed instrument.

It is apparent that the method and apparatus of our invention may be used to monitor suspended silt in a flowing body of water, as well as for stationary deposits. The sensitivity of the apparatus may be increased by providing a stronger, more intense source, or a more sensitive detector, or both; or a source having predominantly lower energy radiations could be employed. The distance between source and probe could then be widened, so that a large flow of suspended silt could be monitored merely by lowering source and detector into the flowing water to the desired depth.

Having described our invention, we claim:

1. A method for measuring the density of silt deposits on the bottom of a body of water comprising the steps of disposing a source of bremsstrahlung radiations at the bottom in said deposit, disposing a radiation detector in spaced relation thereto within said deposit, and measuring the output of said detector, said output being proportional to the relative amounts of water and silt between said source and said detector.

2. Means for measuring the density of silt deposits at the bottom of bodies of water comprising a source of beta radiations, means for converting said radiations into bremsstrahlung disposed adjacent to said source and in fixed spaced relation therewith, means for disposing said source within said silt deposits, means for detecting the bremsstrahlung which penetrates said silt deposit disposed therewithin in spaced alignment with said conversion means, and means for determining the response of said detecting means coupled thereto, said response being proportional to the density of said silt deposit.

3. Means for measuring the density of silt deposits at the bottom of bodies of water comprising a source of bremsstrahlung radiations and a radiation detector disposed in fixed spaced relation, means for disposing said source and detector within said silt deposit, and means for measuring the response of said detector to indicate said density.

4. Means for measuring the density of silt deposits at the bottom of bodies of water comprising a bifurcated housing, a source of bremsstrahlung radiations disposed in one leg thereof, a bremsstrahlung radiation detector disposed in the other leg thereof, said other leg being provided with a thin window for admitting radiations to said detector, means for lowering said housing into said silt deposit, means for measuring the output of said detector in response to said radiations, said response being proportional to the density of said silt.

5. A method for measuring the density of silt deposits at the bottom of bodies of water comprising the steps of sampling said silt, removing substantially all the water from said sample, exposing said sample to a source of bremsstrahlung, disposing a detector opposite said source, measuring the response of said detector to transmission of radiation through said sample to obtain a first calibration point, diluting said sample with a predetermined quantity of water and obtaining a second calibration point of detector response in proportion to density, repeating said calibration steps to obtain a plurality of points corresponding to a wide range of densities, disposing a source of bremsstrahlung radiations and a radiation detector in spaced relation within said deposit, and measuring the response of said detector.

6. The method of analyzing a flowing mass of water to determine the amount of soil suspended therein comprising the steps of disposing a source of bremsstrahlung radiations below the surface of said water, disposing a radiation detector in spaced relation thereto and below said surface, and measuring the output of said detector.

7. The method of measuring the quantity of a material which comprises interposing said material between a source of bremsstrahlung radiation and a radiation detector, subjecting said material to bremsstrahlung radiation from said source, detecting at least a portion of the radiation which passes through said material, and converting said detected radiation into electrical signals representative of the quantity of said material.

References Cited in the file of this patent

UNITED STATES PATENTS

| 2,264,725 | Shoupp et al. | Dec. 2, 1941 |
| 2,661,550 | Graham | Dec. 8, 1953 |

OTHER REFERENCES

Sourcebook on Atomic Energy, by Samuel Glasstone, copyright 1950 by Van Nostrand Co. Paragraph 7.60, pages 165, 166.